United States Patent [19]

Kobayashi et al.

[11] Patent Number: 5,150,593

[45] Date of Patent: Sep. 29, 1992

[54] SHIFT LEVER DEVICE FOR AUTOMATIC TRANSMISSION

[75] Inventors: Tsutomu Kobayashi; Kazuo Kojima, both of Tochigi, Japan

[73] Assignee: Honda Giken Kogyo Kabushiki Kaisha, Tokyo, Japan

[21] Appl. No.: 318,281

[22] Filed: Mar. 3, 1989

[30] Foreign Application Priority Data

Mar. 4, 1988 [JP] Japan ............................ 63-28857

[51] Int. Cl.⁵ .................................................. B60R 25/06
[52] U.S. Cl. .................................... 70/248; 70/279; 74/538; 74/878; 192/4 A
[58] Field of Search ................. 70/245, 246, 247, 248, 70/279, 192–194, 196, 251; 180/315, 316, 332; 74/878, 538; 192/4 A

[56] References Cited

U.S. PATENT DOCUMENTS

| 1,675,465 | 7/1928 | Roehrich | 70/248 |
|---|---|---|---|
| 1,778,294 | 10/1930 | Kennedy | 70/248 |
| 1,805,088 | 5/1931 | Hardesty | 70/248 |
| 3,465,559 | 9/1969 | Rhodes et al. | 70/248 |
| 3,504,511 | 4/1970 | Allen | 70/279 |
| 4,473,141 | 9/1984 | Mochida | 192/4 A X |
| 4,671,085 | 6/1987 | Yamaguchi et al. | 70/248 |
| 4,887,702 | 12/1989 | Ratke et al. | 70/248 X |
| 4,932,493 | 6/1990 | Sakurai et al. | 192/4 A X |
| 4,934,496 | 6/1990 | Barske et al. | 192/4 A |
| 4,947,967 | 8/1990 | Kito et al. | 192/4 A |

FOREIGN PATENT DOCUMENTS 57-163427 4/1981 Japan.
59-176253 11/1984 Japan.

Primary Examiner—Lloyd A. Gall

[57] ABSTRACT

A shift lever device for use with an automatic transmission includes a shift lever reversibly movable from a parking position to a selected one of a plurality of gear range positions, a lock member for locking the shift lever against movement from the parking position, an actuator for actuating the lock member to release the shift lever which has been locked in the parking position by the lock member, and a release member operable for actuating the lock member to release the shift lever independently of the actuator. The release member is operable manually by a key which may be an ignition key to an automotive vehicle on which the automatic transmission is mounted.

4 Claims, 2 Drawing Sheets

SHIFT LEVER DEVICE FOR AUTOMATIC TRANSMISSION

BACKGROUND OF THE INVENTION

1. Field of the Invention

The present invention relates to a shift lever device for use with an automatic transmission.

2. Description of the Prior Art

There is known from Japanese Laid-Open Utility Model Publication No. 57-163427 a shift lever device for an automatic transmission on an automotive vehicle, the shift lever device having lock means for preventing a shift lever from moving from a parking position and a solenoid for actuating the lock means. After the engine on the automotive vehicle has started operating, the shift lever which has been locked in the parking position by the lock means is released from the parking position on the condition that the brake pedal is depressed. It is preferable from the standpoint of safety that the shift lever remain locked in the parking position unless the condition of depressing the brake pedal is met.

It is also desirable to provide the shift lever device with release means for manually releasing the locked shift lever from the parking position when the shift lever device is to be serviced.

SUMMARY OF THE INVENTION

In view of the aforesaid demand, it is an object of the present invention to provide a shift lever device for use with an automatic transmission, which includes means for releasing a shift lever which has been locked in a parking position by lock means, in response to manual operation using a key, particularly an ignition key.

According to the present invention, there is provided a shift lever device for use with an automatic transmission, comprising: a shift lever reversibly movable from a parking position to a selected one of a plurality of gear range positions; a lock member for locking the shift lever against movement from the parking position; an actuator for actuating the lock member to release the shift lever which has been locked in the parking position by the lock member; and release means operable for actuating the lock member to release the shift lever independently of the actuator. The release means is operable manually by key means. The automatic transmission is mounted on an automotive vehicle, the key means comprising an ignition key to the automotive vehicle.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
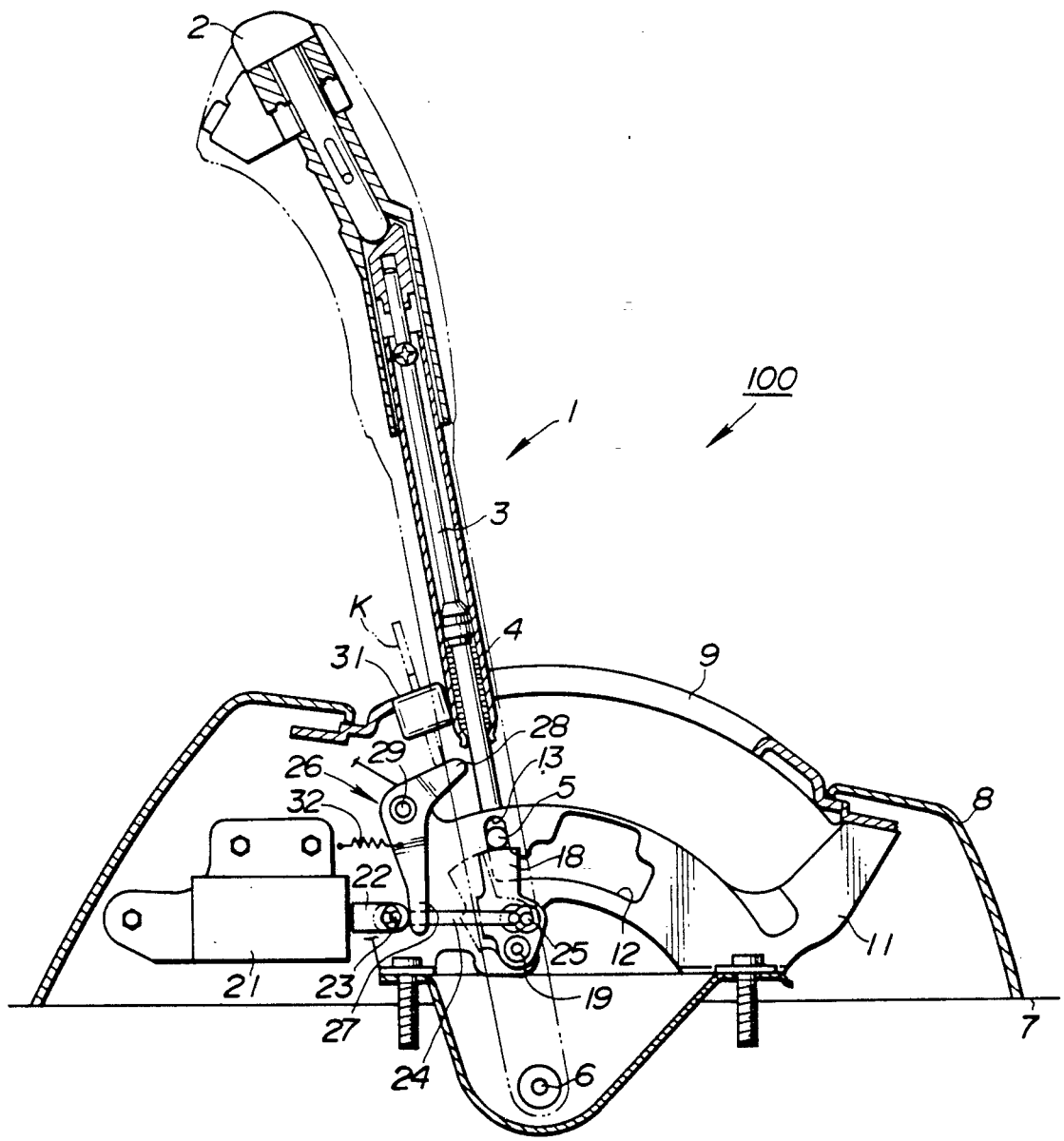
FIG. 1 is a side elevational view, partly in cross section, of a shift lever device for an automatic transmission in accordance with an embodiment of the present invention.

FIG. 1 shows a shift lever device, generally denoted at 100, for use with an automatic transmission (not shown) on an automotive vehicle, in accordance with the present invention.

The shift lever device 100 includes a shift lever 1 having a lower end coupled to a pivot shaft 6 which is operatively connected to the automatic transmission. The shift lever 1 projects upwardly through an escutcheon 9 positioned in an opening in a central console 8 mounted on a floor body 7 of the automotive vehicle, the shift lever 1 being angularly movable back and forth (i.e., in directions parallel to the sheet of FIG. 1).

The shift lever 1 has an upper grip supporting a lock button 2 with its lower end abutting against the upper end of an unlock rod 3 extending axially through the shift lever 1. When the lock button 2 is depressed, the unlock rod 3 is lowered against the bias of a spring 4 disposed in the shift lever 1 around the unlock rod 3. A lock pin 5 projects laterally from the lower end of the unlock rod 3 which is positioned in the central console 8. The lock pin 5 extends laterally through the shift lever 1 into a guide hole 12 defined in a guide plate 11 lying along an arcuate range in which the lock pin 5 is angularly movable in response to back-and-forth movement of the shift lever 1.

Figure 2:
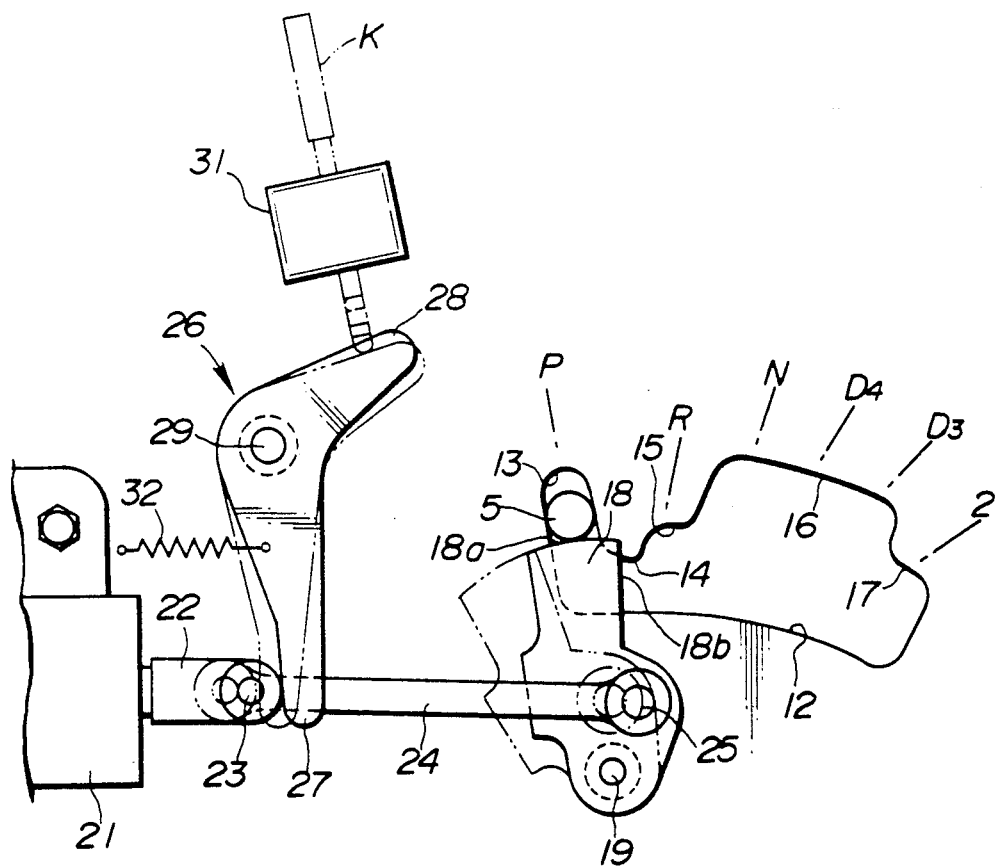
FIG. 2 is an enlarged side elevational view of major parts of the shift lever device, the view illustrating a manual release operation for the shift lever device.

As also shown in FIG. 2, the guide hole 12 has a shape including, in the order from its front edge, a deeper recess 13 extending upwardly to provide a parking position [P], a projection 14 projecting downwardly for the lock pin 5 to move over, a shallower recess 15 extending upwardly to provide a reverse position [R], a deeper recess 16 extending upwardly and in the back-and-forth direction along the guide plate 11 to provide a neutral position [N], a drive position [D₄] ranging from first through fourth gears, and a drive position [D₃] ranging from the first through third gears, and a shallower recess 17 extending upwardly to provide a second-gear holding position [2], the recesses 15, 16, 17 being defined as continuous recesses.

A lock plate 18 (or lock member) is disposed as lock means laterally and downwardly of the parking-position recess 13. The lock plate 18 is of such a shape which has, at least, a closing end 18a for closing the recess 13 from below, and a pressing end 18b facing the recesses 15, 16, 17. The lock plate 18 has a lower end angularly movably supported on a pivot shaft 19. A solenoid (or actuator) 21 having a return spring (not shown) is disposed in and secured to the central console 8 by three bolts in front of the lock plate 18. The solenoid 21 has a rearwardly extending first rod (clevis) 22 to which a second rod 24 is coupled by a pivot pin 23. The second rod 24 has a rear end connected to the lock plate 18 by means of a pivot pin 25.

A bell crank 26 is disposed as a release means above the second rod 24. The bell crank 26 includes a downwardly extending lever arm 27 and a rearwardly extending lever arm 28 joined to the lever arm 27 at an intermediate portion which is pivotally supported on a pivot shaft 29. The lever arm 27 has a lower end resiliently held against the rear end of the first rod 22 under the spring force of a spring 32. The spring force of the spring 32 is selected to be weaker than the spring force of the return spring in the solenoid 21. A guide key cylinder 31 is located above the lever arm 28 and mounted on a front portion of the escutcheon 9. The guide key cylinder 31 has a key slot defined vertically therethrough for receiving and guiding a guide key K.

When the solenoid 21 is de-energized, the first rod 22 is moved rearwardly as indicated by the solid lines under the bias of the return spring in the solenoid 21. The second rod 24 pivotally coupled to the rear end of the first rod turns the lock plate 18 rearwardly about the pivot shaft 19 to close the parking-position recess 13 from below for retaining the lock pin 5 against movement out of the recess 13. More specifically, the closing end 18a of the lock plate 18 is angularly moved across and below the recess 13 to close the lower open end of the recess 13 in which the lock pin 5 is positioned. As long as the solenoid 21 remains de-energized, the recess 13 remains closed by the lock plate 18. When the solenoid 21 is energized, the first rod 22 is pulled forwardly as indicated by the imaginary lines against the bias of the return spring in the solenoid 21. The second rod 24 is also pulled forwardly to turn the lock plate 18 forwardly until it opens the recess 13. The lock plate 18 can thus move selectively into the position to close the recess 13 to retain the lock pin 5 therein and can move into the position to open the recess 13 to release the lock pin 5 therefrom, through the simple structure, for reliably locking the shift lever 1 in the parking position [P] and unlocking the shift lever 1 from the parking position [P].

The solenoid 21 is energized only when the ignition key K inserted in an engine starting key cylinder (not shown) to start the engine (not shown) of the automotive vehicle, the shift lever 1 is detected in the parking position [P], and the brake pedal (not shown) of the automotive vehicle is depressed When even one of the above three conditions is not met, e.g., when the engine is not started, or when the automotive vehicle is running, the solenoid 21 remains de-energized, and hence the recess 13 remains closed by the lock plate 18.

When all of the above three conditions are met, i.e., when the engine is started, the shift lever 1 is in the parking position [P], and the brake pedal is depressed, then the lock plate 18 unlocks the lock pin 5 which can thus be released from the recess 13, so that the shift lever 1 can be moved to shift the transmission gears.

When the automotive vehicle is stopped while the engine is running, and the shift lever 1 is to be moved into the parking position [P], since the solenoid 21 is deenergized, the recess 13 is closed by the closing end 18a of the lock plate 18. By forcibly moving the shift lever 1 forwardly toward the parking position [P], the lock pin 5 forces the pressing end 18b of the lock plate 18 in the forward direction (to the left in FIG. 1), and hence can be placed in the recess 13.

There may be an occasion wherein he automotive vehicle should be moved for inspection or servicing when the solenoid 21 is de-energized for some reason and the shift lever 1 is located in the parking position [P]. At this time, the shift lever 1 is prevented from moving from the parking position [P] by the lock plate 18. According to the present invention, to allow the shift lever 1 to be shifted from the parking position [P] in such an occasion, the ignition key K is inserted, from above, into the key cylinder 31 on the central console 8. More specifically, the ignition key K is inserted into the key cylinder 31 to cause the lower end of the ignition key K to engage and push the lever arm 28 of the bell crank 26 downwardly. As indicated by the imaginary lines in FIG. 2, the bell crank 26 is now turned clockwise about the pivot shaft 29 to enable the lever arm 27 to press the rear end of the first rod 22 to move the first rod 22 forwardly into the solenoid 21 against the spring force of the return spring in the solenoid 21. The lock plate 18 is turned forwardly by the second rod 24 until the closing end 18a of the lock plate 18 opens the lower end of the recess 13. The lock pin 5 can now be released from the parking position [P] to allow the shift lever 1 to be shifted.

With the present invention, as described above, the shift lever which has been locked in the parking position by the lock means can be released by manual operation using a key. Since the shift lever cannot be released from the parking position unless the key is used, unauthorized or unnecessary manual operation to release the shift lever from the parking position is prevented. Where the key is an ignition key for the vehicle, the shift lever is prevented from being manually released accidentally from the parking position while the engine is in operation, since the ignition key would be in the ignition when the engine is in operation.

Although there has been described what is at present considered to be the preferred embodiment of the present invention, it will be understood that the invention may be embodied in other specific forms without departing from the essential characteristics thereof. The present embodiment is therefore to be considered in al aspects as illustrative, and not restrictive The scope of the invention is indicated by the appended claims rather than by the foregoing description.

We claim:

1. A shift lever device for use with an automatic transmission, comprising:

a shift lever having a lock pin and reversibly movable from a parking position to a selected one of a plurality of gear range positions;

a guide plate disposed at least along a range of movement of said shift lever and having a first recess for receiving said lock pin therein, said first recess corresponding to said parking position, and a second recess region corresponding to said plurality of gear range positions, said first recess and second recess region being defined in said guide plate, such that said guide plate allows said lock pin to move through said first recess and second recess region in response to movement of said shift lever;

a lock plate movable for selectively locking said lock pin in said first recess and releasing said lock pin for movement from said first recess;

an actuator for actuating said lock plate to lock and release said lock pin;

release means operable for actuating said lock plate independently of said actuator, in order to release said lock pin for movement from said first recess, wherein said release means is operable manually by a key; and wherein said actuator comprises a solenoid having a return spring and a rod coupled between said return spring and said lock plate for actuating said lock plate to lock said lock pin in said first recess under the bias of said return spring when said solenoid is de-energized, and wherein said release means includes means for urging said rod to move said lock plate against the bias of said return spring in order to release said lock pin for movement from said first recess.

2. A shift lever device according to claim 1, wherein said lock plate has at least a closing end for closing said first recess to retain said lock pin in said first recess, and a pressing end which is pressable by said lock pin to allow said lock pin to move from said second recess region toward said first recess against the bias of said return spring in response to movement of said shift lever.

3. A shift lever device for use with an automatic transmission, comprising:
- a shift lever having a lock pin and reversibly movable from a parking position to a selected one of a plurality of gear range positions;
- a guide plate disposed at least along a range of movement of said shift lever and having a first recess for receiving said lock pin therein, said first recess corresponding to said parking position, and a second recess region corresponding to said plurality of gear range positions, said first recess and second recess region being defined in said guide plate, wherein said guide plate allows said lock pin to move through said first recess and second recess region in response to movement of said shift lever;
- a lock plate movable for selectively locking said lock pin in said first recess and releasing said lock pin for movement from said first recess;
- an actuator for actuating said lock plate to lock and release said lock pin, said actuator comprising:
  - a solenoid having a return spring, and
  - a rod coupled between said return spring and said lock plate for actuating said lock plate to lock said lock pin in said first recess under the bias of said return spring when said solenoid is de-energized; and
- release means operable for actuating said lock plate independently of said actuator, in order to release said lock pin for movement from said first recess, said release means being operable manually by a key, and
- wherein said release means includes:
- urging means for urging said rod to move said lock plate against the bias of said return spring in order to release said lock pin for movement from said first recess, and said key and a key cylinder for inserting said key therethrough,
- wherein said urging means includes
  - a bell crank having a first lever arm engageable with a lower end of said key inserted through said key cylinder,
  - a second lever arm engaging said rod, and
  - an intermediate portion positioned between said first and second lever arms and supported on a pivot shaft, and
- wherein said bell crank is turned by pressing the lower end of said key inserted through said key cylinder against said first lever arm, to cause said second lever arm to urge said rod to move said lock plate to release said lock pin for movement from said first recess.

4. A shift lever device according to claim 3, wherein said key comprises an ignition key to said automotive vehicle.

* * * * *